July 12, 1949.

R. C. BAKER 2,475,687

FRUIT PICKER

Filed Sept. 23, 1946

INVENTOR.
Reuben C. Baker
BY
Mellin & Hanscom
ATTORNEYS

July 12, 1949.  R. C. BAKER  2,475,687
FRUIT PICKER

Filed Sept. 23, 1946  2 Sheets-Sheet 2

INVENTOR.
Reuben C. Baker
BY
Mellin & Hanscom
ATTORNEYS

Patented July 12, 1949

2,475,687

UNITED STATES PATENT OFFICE 2,475,687

FRUIT PICKER

Reuben C. Baker, Coalinga, Calif., assignor to Baker Oil Tools, Inc., Vernon, Calif., a corporation of California Application September 23, 1946, Serial No. 698,679

11 Claims. (Cl. 56—333)

This invention relates to fruit pickers, and particularly to devices for gathering fruit disposed in trees out of easy hand reach of a person.

Certain types of fruit, such as avocados, offer difficulties in picking them from trees because of their remote location from the ground. These difficulties are enhanced by dense tree foliage which tends to hide both the fruit and the operating mechanism of a mechanical picker that might be employed. The operator of the fruit picker is not assured that the fruit has entered the device fully before it is severed from the tree, which all too often results in damage of the fruit by the picker mechanism, or failure to recover the fruit.

It is, accordingly, an object of the present invention to overcome the aforementioned difficulties by providing a fruit picker which insures recovery of the desired fruit without injury to it.

Another object of the invention is to provide a fruit picker in which severing of the fruit from the tree is determined by the fruit itself.

Still a further object of the invention is to provide a fruit picker in which the fruit is severed automatically from the tree after it has been confined completely within the picker device.

In its general aspects, the invention contemplates a fruit picker having a spring or similar source of power for operating one or more knives functioning to sever the fruit from the tree or bush to which it might be attached. The motive power device is normally held ineffective by a latch mechanism which is releasable by the fruit itself. The spring device is energized for operation by the operator, and then elevated until its container completely encloses the fruit, whereupon the latter engages a tripping mechanism to release the latch mechanism, which then permits the spring device to actuate the knives and sever the fruit from the tree.

One form which the invention may assume is exemplified in the following description and illustrated by way of example in the accompanying drawings, in which.

Figure 1:
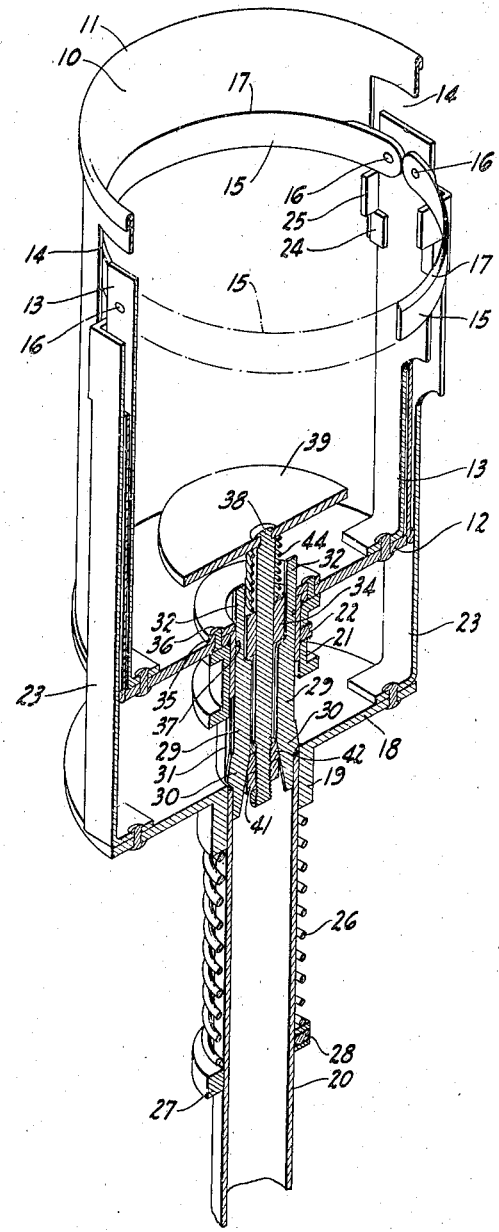
Fig. 1 is a longitudinal sectional and perspective view of the fruit picker with its parts in position to receive and sever fruit from a tree.
Figure 2:
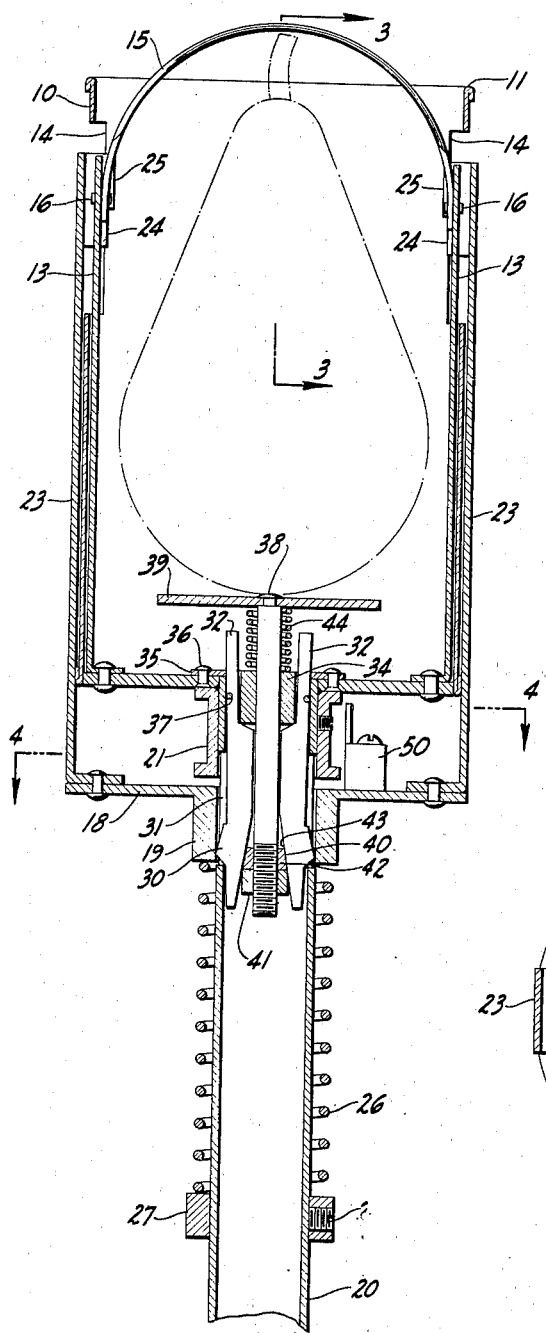
Fig. 2 is a longitudinal section through the fruit picker with its parts in tripped position containing the severed fruit.
Figure 3:
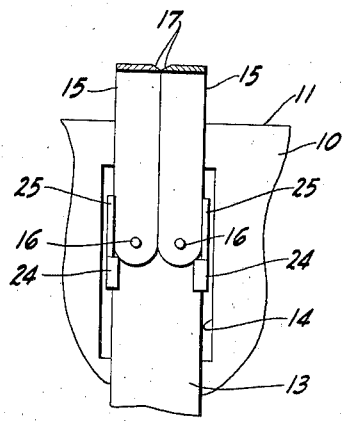
Fig. 3 is a partial longitudinal section taken along the line 3—3 of Fig. 2.
Figure 4:
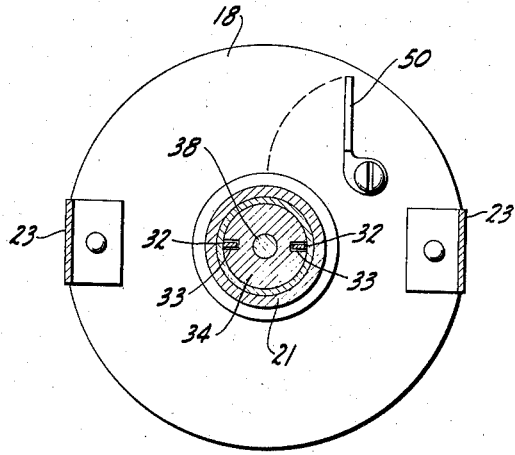
Fig. 4 is a cross-section taken generally along the line 4—4 of Fig. 2.

In the specific form of the invention disclosed in the drawings, a container or receptacle 10 of generally cylindrical form has an open upper end 11 and a base 12 to which are suitably secured diametrically opposed supporting uprights 13 extending along the inner wall of the container, with their upper ends terminating adjacent diametrically opposed openings or windows 14 in the container. A pair of generally semi-circular knives 15 are pivotally mounted on the upper ends of the uprights 13 by means of pivot pins 16 or the like, being movable from an open generally horizontal position around the interior of the container 10 toward a generally vertical position with their cutting edges 17 substantially in contact with one another.

Movement of the cutting knives 15 toward each other is produced by an actuating mechanism, consisting of an actuator plate 18 whose hub portion 19 is slidable along a relatively long tubular rod 20. This rod is secured to an encircling sleeve 21 by a set screw 22, the sleeve being welded or otherwise suitably attached to the base 12 of the container. In effect, the rod 20 is thus securely attached to the container 10.

A pair of actuator arms 23 in alignment with the supporting uprights 13 are secured to the outer portion of the actuator plate 18, extending upwardly along the exterior of the cylindrical container to a point adjacent and below the open knives 15. The upper ends of the actuator arms 23 project inwardly through the container windows 14 with their fingers 24 bent or formed around the uprights to guide the arms in sliding along the latter. The uprights are also provided with lugs 25 extending inwardly through the windows 14 under the knives 15. These lugs are so arranged with respect to the knives as to swing them upwardly on their pivots 16 upon upward movement of the actuator arms 23, and thus move the knives to a vertical severing position.

The actuator plate 18 and arms 23 are urged in an upward direction with respect to the container 10 and rod 20 by a helical spring 26 encircling the tubular rod, with its upper end bearing against the actuator plate hub 19 and its lower end against an abutment in the form of a ring 27 secured to the rod by a set screw 28 or the like.

The actuating mechanism is initially retained in a lower position with respect to the container 10, rod 20 and knives 15 by a latching device, which serves to hold the spring 26 compressed against the rod abutment 27. This latching device consists of a pair of diametrically opposed latches 29 having outwardly directed lower tapered noses 30 extending through rod slots 31 and engageable with the actuator plate 18 to hold the latter in a downward position against the action of the compressed spring 26. The upper arm portions 32 of these latches extend through slots 33 in a guide hub 34 having an outwardly directed flange 35 suitably secured to the bottom 12 of the container, as by rivets 36. A split spring ring 37 may encompass the arms 32 of the latches to couple the latches for conjoint movement.

A latch rod 38 extends through the guide 34 with its upper end projecting into the container 10 for attachment to a plate 39 and with its lower portion depending from the container along the latches 29. A tapered latch retainer 40 is threaded on the lower end of the rod 38 and is secured in position by a suitable lock nut 41. The tapered surface 42 on the retainer is inclined in an upward and inward direction for cooperation with companion tapers 43 on the inner faces of the latches in the region of their nose portions 30. A latch spring 44 has its lower end bearing against the guide 34 and its upper end against the plate 39 and tends to retain the latch retainer 40 in an upward position against the inclined faces 43 on the latches in order to hold their noses 30 in engagement with the upper side of the actuator plate 18, thereby maintaining the actuating mechanism 26, 18, 23, 25 in a lower position and the actuator spring 26 in compressed condition, allowing the knives 15 to remain in a horizontal, open position.

The device is elevated toward the avocado or other fruit to be picked from the tree on a suitable length of tubular rod 20 by the operator, with the parts disposed in the position shown in Fig. 1. In this position, the tapered latch noses 30 engage the actuator plate 18, and the latches 29 cannot be shifted inwardly free from the actuator plate by the force of the actuator spring 26, in view of the engagement of the inner tapered surfaces 43 on the latches with the latch retainer 40, which is held in an elevated position by the relatively light latch spring 44.

As will be noticed from an inspection of Fig. 1, the actuator lugs 25 are disposed immediately below the open knives 15. The container 10 is elevated over the fruit until the latter is positioned within the container, whereupon it will engage the latch or retainer plate 39 and press it, together with the latch rod 38, downwardly against the action of the relatively light latch spring 44, shifting the retainer 40 downwardly a sufficient distance to permit the spring 26 to force the latches 29 inwardly free of the actuator plate 18, by virtue of the engagement of the latter against the upwardly and outwardly inclined noses 30 on the latches. This inclination is such that the removal of the retainer 40 downwardly from a latch restraining position allows the latches 29 to be shifted inwardly by the spring pressed actuator 18 until they are clear of the actuator plate.

As soon as such disengagement of the latches occurs, the spring 26 may expand suddenly and shift the actuator plate 18, together with the actuator arms 23, in an upward direction along the container 10 and uprights 13. The actuating lugs 25 engage the knives 15 and swing them rapidly toward a vertical position, causing their cutting edges 17 to engage and sever the stem of the fruit. The apparatus with the fruit confined within the container 10 may now be lowered to the ground for removal of the fruit.

The mechanism may then be reset for another trip through the tree by depressing the actuator plate 18 against the spring 26 until the plate is disposed below the latch noses 30, allowing the latch spring 44 to re-elevate the rod 38 and latch retainer 40 to a restricting position against the tapered latch surfaces 43, forcing and holding the latch noses 30 outwardly to a position in reengagement with the actuator plate 18, to hold the actuator plate and prevent expansion of the re-compressed spring 26. The knives 15 may be returned by hand or a hand held stick to a horizontal open position around the interior of the container 10.

In order to avoid inadvertent tripping of the device and possible injury to the operator, a safety latch 50 may be pivotally mounted on the actuator plate 18 for swinging movement laterally of the plate to a position under the sleeve 21. This latch 50 then serves as a solid abutment between the actuator 18 and container 10, preventing upward movement of the actuating device along the container despite accidental removal of the latch noses 30 from engagement with the actuator plate 18. When the apparatus is to be used, the safety latch 50 may be swung outwardly to an ineffective position, free from engagement with the sleeve 21.

It is, therefore, apparent that a fruit picker has been provided which is automatic in operation, since its actuation is entirely under the control of the fruit itself. The fruit cannot be injured, for the reason that the knives are swung to severing position only after the fruit has been disposed completely within the container, with the stem alone exposed to the severing action of the knives.

While I have shown the preferred form of my invention, it is to be understood that various changes may be made in its construction by those skilled in the art without departing from the spirit of the invention as defined in the appended claims.

Having thus described my invention, what I claim and desired to secure by Letters Patent is:

1. A fruit picker, including supporting means comprising a container for the reception of fruit to be picked from a tree or the like, means carried by the upper portion of said supporting means for severing said fruit from said tree when said fruit is in said container, and means operatively associated with said severing means and disposed partly within the lower portion of said container for actuating said severing means, the portion of said means disposed within said container being controlled by said fruit when said fruit is disposed in said container.

2. A fruit picker, including a container for the reception of fruit to be picked from a tree or the like, means associated with said container for severing said fruit from said tree, means operatively associated with said severing means for actuating said severing means, and means engageable with said actuating means for preventing operation of said actuating means, said preventing means being releasable by said fruit when said fruit is in said container to permit operation of said actuating means.

3. A fruit picker, including means for severing fruit from a tree or the like, means operatively associated with said severing means for actuating said severing means, and latch means engageable with said actuating means for preventing operation of said actuating means, said latch means being disposed in position to be released upon engagement by said fruit to permit operation of said actuating means.

4. A fruit picker, including a container for the reception of fruit to be picked from a tree or the like, means associated with said container for severing said fruit from the tree, said means comprising a cutter and a spring for moving said cutter in a severing direction, and latch means engageable with said severing means for preventing operation of said severing means, said latch means being releasable by said fruit upon its entry into said container.

5. A fruit picker, including means for severing fruit from a tree or the like, said means comprising a cutter and a spring for moving said cutter in a severing direction, and latch means engageable with said severing means for initially preventing operation of said severing means, said latch means being releasable upon its engagement by said fruit to permit said spring to actuate said cutter.

6. A fruit picker, including a container for the reception of fruit to be picked from a tree or the like, cutting means operatively associated with said container for severing said fruit from said tree while said fruit is disposed in said container, spring actuated means operatively associated with said cutting means for moving said cutting means, latch means engageable with said spring actuated means for holding it in ineffective position, and shiftable means operatively associated with said latch means for retaining said latch means in engagement with said spring actuated means, said shiftable means being disposed in said container for engagement and movement by said fruit to a releasing position with respect to said latch means.

7. A fruit picker, including a container for the reception of fruit to be picked from a tree or the like, cutting means operatively associated with said container for severing said fruit from said tree while said fruit is disposed in said container, spring actuated means operatively associated with said cutting means for moving said cutting means, means for preventing movement of said spring actuated means comprising a latch operatively associated with said spring actuated means for restraining said spring actuated means and movable by said spring actuated means from its restraining position, and a retainer operatively associated with said latch for preventing movement of said latch from its restraining position, said retainer being engageable and releasable by said fruit.

8. A fruit picker, including cutting means for severing fruit from a tree or the like, spring actuated means operatively associated with said cutting means for moving said cutting means, latch means engageable with said spring actuated means for holding said spring actuated means in ineffective position, and shiftable means operatively associated with said latch means for retaining said latch means in engagement with said spring actuated means.

9. A fruit picker, including cutting means for severing fruit from a tree or the like, spring actuated means operatively associated with said cutting means for moving said cutting means, means for preventing movement of said spring actuated means comprising a latch operatively associated with said spring actuated means for restraining said spring actuated means and movable by said spring actuated means from its restraining position, and a retainer engageable with said latch for preventing said spring actuated means from moving said latch from its restraining position.

10. A fruit picker, including a receptacle for fruit to be picked from a tree or the like, a pair of knives movably mounted on said receptacle, means engageable with said knives for actuating said knives toward one another, a spring operatively associated with said actuating means for operating said actuating means, a latch operatively associated with said spring for holding said spring energized and in ineffective position, said latch being constructed and arranged for shifting by said spring from its holding position, and retainer means engageable with said latch for preventing shifting of said latch from its holding position, said retainer means extending into said receptacle and being movable by said fruit to a position permitting shifting of said latch from its holding position.

11. A fruit picker, including a receptacle for fruit to be picked from a tree or the like, a pair of knives pivotally mounted on said receptacle and swingable upwardly toward one another, means operatively associated with said knives and movable upwardly with respect to said receptacle for actuating said knives, a spring below said receptacle and engageable with said actuating means, said spring tending to shift said actuating means upwardly, a latch engageable with said actuating means to hold it in a lower position against the force of said spring, said latch being constructed and arranged for shifting by said spring and actuating means from its holding position, and retainer means extending into said receptacle and engageable with said latch for preventing shifting of said latch from its holding position, said retainer means being shiftable downwardly by said fruit when disposed in said receptacle to permit shifting of said latch from its holding positon.

REUBEN C. BAKER.

REFERENCES CITED

The following references are of record in the file of this patent:

UNITED STATES PATENTS

| Number | Name | Date |
|---|---|---|
| 844,601 | Koerper | Feb. 19, 1907 |
| 1,467,262 | Barker | Sept. 4, 1923 |
| 1,825,601 | Palmbush | Sept. 29, 1931 |